J. J. CRONIN.
ICE CARRIER.
APPLICATION FILED JULY 22, 1920.
1,375,213.
Patented Apr. 19, 1921.
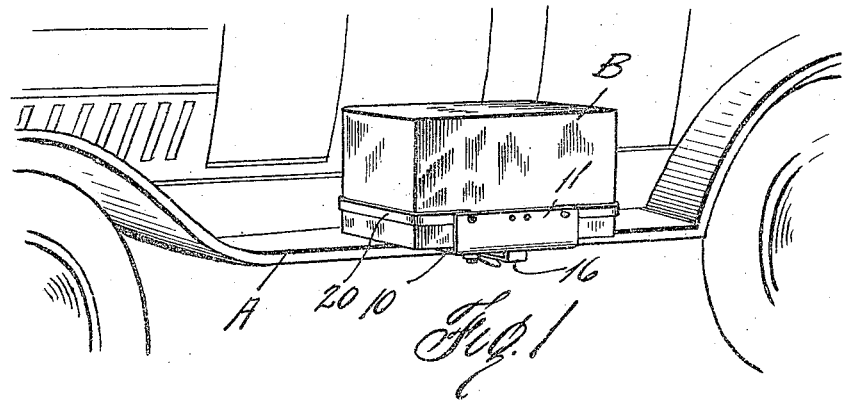
Fig. 1.
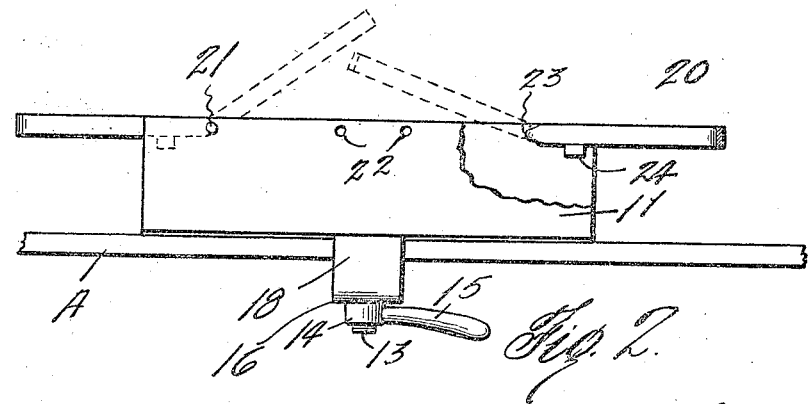
Fig. 2.
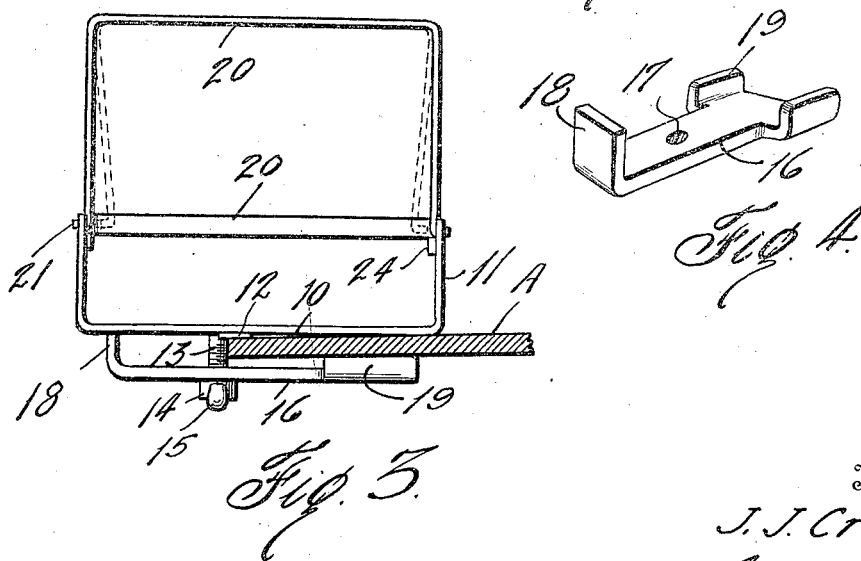
Fig. 3.
Fig. 4.
Inventor
J. J. Cronin.
By
Attorney

UNITED STATES PATENT OFFICE.

JOHN J. CRONIN, OF DALLAS, TEXAS.

ICE-CARRIER.

1,375,213.   Specification of Letters Patent.   Patented Apr. 19, 1921.

Application filed July 22, 1920. Serial No. 398,197.

*To all whom it may concern:*

Be it known that I, JOHN J. CRONIN, a citizen of the United States, residing at Dallas, in the county of Dallas and State of Texas, have invented certain new and useful Improvements in Ice-Carriers, of which the following is a specification.

This invention relates to new and useful improvements in ice carriers.

The aim of the invention is to provide a carrier which may be removably attached to the running board of an automobile so as to adequately support and retain a block of ice thereon for the purpose of transporting. Another feature is to make the device adjustable for accommodating blocks of different lengths so that the same may be carried in an efficient manner.

In carrying out the invention a base member having upturned sides and open ends is provided. Adjustable keepers are arranged to engage the side members and project from the ends of the base member so that the block of ice will be confined between the keepers and the upturned sides. A clamp device is attached to the underside of the base so as to fulcrum against the same and also to engage under the running board of an automobile, whereby the carrier is fastened onto the running board and is also positioned with a portion overhanging the outer edge of said board.

The invention will be more readily understood from a reading of the following specification and by reference to the accompanying drawings, in which an example of the invention is shown, and wherein:

Figure 1 is a perspective view of a portion of an automobile showing the running board equipped with a carrier constructed in accordance with this invention, Fig. 2 is a side elevation of the carrier, Fig. 3 is an end elevation of the same, the running board being in section, and Fig. 4 is a perspective view of the clamp bracket.

In the drawings the numeral 10 designates a flat base member provided at each side with upturned flanges or sides 11. The parts 10 and 11 are preferably made integral and formed from a single sheet of metal which may be readily bent into shape as is obvious. The ends of the base member are open. On the underside of the member 10 a strip 12 fastened longitudinally. A bolt 13 depends from the bottom of the member 10 at the strip 12. This bolt is screw-threaded and receives a nut 14 provided with a hand lever 15. The nut is threaded on the bolt and supports a clamp bracket 16.

The clamp bracket has a hole 17 at its central portion through which the bolt 13 passes. This bracket is provided at its outer end with an upturned lug 18, while at its inner end it has angular upwardly directed wings 19 at each side. The base member 10 is fitted over the running board A of the automobile so that the strips 12 rest along the outer edge of said running board and the bolt 13 abuts the edge of the running board, thus limiting the inward movement of the carrier. This leaves a portion of the base and one of the sides 11 projecting beyond the outer edge of said running board. The clamp member has its lug 18 in engagement with the overhanging portion of the underside of the base 10 and its wings 19 in engagement with the underside of the running board A. By turning the handle 15 the nut 14 is rotated so as to bear against the underside of the bracket 16. The lug 18 acts as a fulcrum and thus the wings 19 are swung up into gripping relation with the underside of the running board, whereby the carrier is securely fastened. The clamp and associate parts are concealed under the base 10 and the running board and are out of the way. The base may be readily removed by loosening the nut 14 as will be obvious.

The block of the ice B is received on the base 10 between the sides 11. The sides 11 prevent the inward and outward displacement of the block of ice, but some means should be provided for holding the same against displacement in a forward or rearward direction. For this purpose I provide a pair of yoke-shaped keepers 20, preferably made of spring metal. Each keeper has outwardly directed trunnions 21 at its end, formed by reducing the stock and rounding the same. The keepers fit inside and between the sides 11. Holes 22 and 23 are provided near the upper edges of the sides snugly receiving the trunnions. Stops 24 are fastened to the inner faces of the sides 11 so as to support the keepers in a horizontal position when the latter are swung down onto said stops. When the trunnions 21 engage in the outermost hole 23 the keepers and sides provide an area in which a one hundred pound block of ice may be snugly confined. By swinging the keepers together and withdrawing the trunnions from the holes 23, said trunnions may be engaged with the hole 22, whereby the keepers will be withdrawn into the carrier so as to confine a smaller block of ice. Of course, various kinds of adjustments could be made or provided for. It will be seen that when the keepers are not in use they may be folded inwardly as is indicated in dotted lines in Fig. 2, and then swung down and nested between the sides 11; thereby making a compact structure for shipping and handling. The keepers may also be swung to the position shown in dotted lines in Fig. 2, to serve as handles for carrying the carrier when it is not fastened on the automobile. This device can be made of a very substantial nature and can be quickly applied and removed from the running board. The strip 12 will serve to tilt the outer side of the base member 10 slightly upwardly and thus if the running board A is sunk downward, this arrangement will tend to level the base 10. The clamp 16 may be very tightly secured and the liability of the carrier being displaced from the running board is reduced to a minimum.

What I claim is:

1. In a carrier to be arranged upon the running board of an automobile or the like, comprising a base adapted to be supported by the running board and projecting laterally therebeyond, said base having upstanding holding means, a screw secured to the base and depending therefrom adjacent the outer edge of the running board, a separate clamp arm having an opening between its ends to receive the screw, with its inner end engaging beneath the running board and its outer end projecting outwardly beyond the running board and engaging the base near its outer edge, and a nut carried by the lower end of the screw.

2. In a carrier to be arranged upon the running board of the automobile or the like, a base adapted to be supported by the running board and projecting laterally therebeyond, said base having upstanding holding means, a screw secured to the base and depending therefrom adjacent the outer edge of the running board, a separate arm having an opening between its ends to receive the screw, with its inner end engaging beneath the running board and its outer end projecting outwardly beyond the running board for a substantial distance, an upwardly extending lug carried by the outer end of the arm and engaging the base, and a nut carried by the lower end of the screw.

3. In an ice carrier, a flat base having upturned sides, a screw depending from the base, a clamp member mounted on the screw, and a nut mounted on the screw and engaging the clamp member, and a pair of yoke-shaped spring keepers having trunnions adjustably engaging in the sides of the base member and extending longitudinally thereof for confining a block of ice on said base member.

In testimony whereof I affix my signature.

JOHN J. CRONIN.